United States Patent [19]

Speiser et al.

[11] 3,965,343

[45] June 22, 1976

[54] MODULAR SYSTEM FOR PERFORMING THE DISCRETE FOURIER TRANSFORM VIA THE CHIRP-Z TRANSFORM

[75] Inventors: Jeffrey M. Speiser; Harper John Whitehouse, both of San Diego, Calif.

[73] Assignee: The United States of America as represented by the Secretary of the Navy, Washington, D.C.

[22] Filed: Mar. 3, 1975

[21] Appl. No.: 554,875

[52] U.S. Cl. .............................................. 235/156

[51] Int. Cl.[2] ........................................... G06F 15/34

[58] Field of Search ........... 235/156, 152, 193, 181; 324/77 B, 77 B, 77 G, 77 H

[56] References Cited

UNITED STATES PATENTS

| | | | |
|---|---|---|---|
| 3,584,782 | 6/1971 | Bergland | 235/156 |
| 3,704,826 | 12/1972 | Constantin | 235/156 |
| 3,721,812 | 3/1973 | Schmidt | 235/156 |
| 3,778,604 | 12/1973 | Bosc | 235/152 |
| 3,783,258 | 1/1974 | Chwastyk | 235/156 |
| 3,808,412 | 4/1974 | Smith | 235/152 |
| 3,816,729 | 6/1974 | Works | 235/156 |
| 3,851,162 | 11/1974 | Munoz | 235/156 |
| 3,881,097 | 4/1975 | Lehmann et al. | 235/156 |
| 3,900,721 | 8/1975 | Speiser et al. | 235/156 |
| 3,920,974 | 11/1975 | Means | 235/152 |
| 3,925,648 | 12/1975 | Speiser et al. | 235/156 |

*Primary Examiner*—Jerry Smith

*Attorney, Agent, or Firm*—Richard S. Sciascia; Ervin F. Johnston; John Stan

[57] ABSTRACT

Two kinds of apparatus for combining $N_2$ chirp-Z transform (CZT) modules of length $N_1$ to perform a discrete Fourier transform (DFT) of length $N_1N_2$. The first method uses an auxiliary parallel-input, parallel-output, DFT device of size $N_2$ and allows the transform of size $N_1N_2$ to be performed in the same time as is required for a single CZT module to perform a size $N_1$ transform. The second method uses an auxiliary parallel-input, serial-output, DFT device of size $N_2$. If the second method is implemented entirely in a single technology, such as with charge-coupled devices (CCDs), it performs the size $N_1N_2$ transform in $N_2$ times the amount of time required for a single CZT module to perform a size $N_1$ transform. If $N_2$ is a composite number, say $N_2 = M_1M_2$, the second method also permits the same hardware to perform $M_1$ simultaneous transforms of length $N_1M_2$.

6 Claims, 11 Drawing Figures

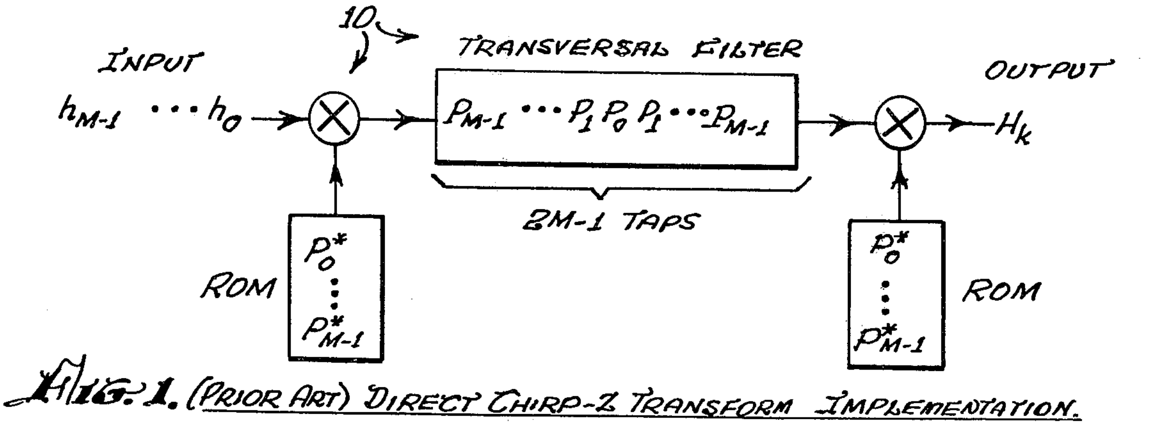
FIG. 1. (PRIOR ART) DIRECT CHIRP-Z TRANSFORM IMPLEMENTATION.
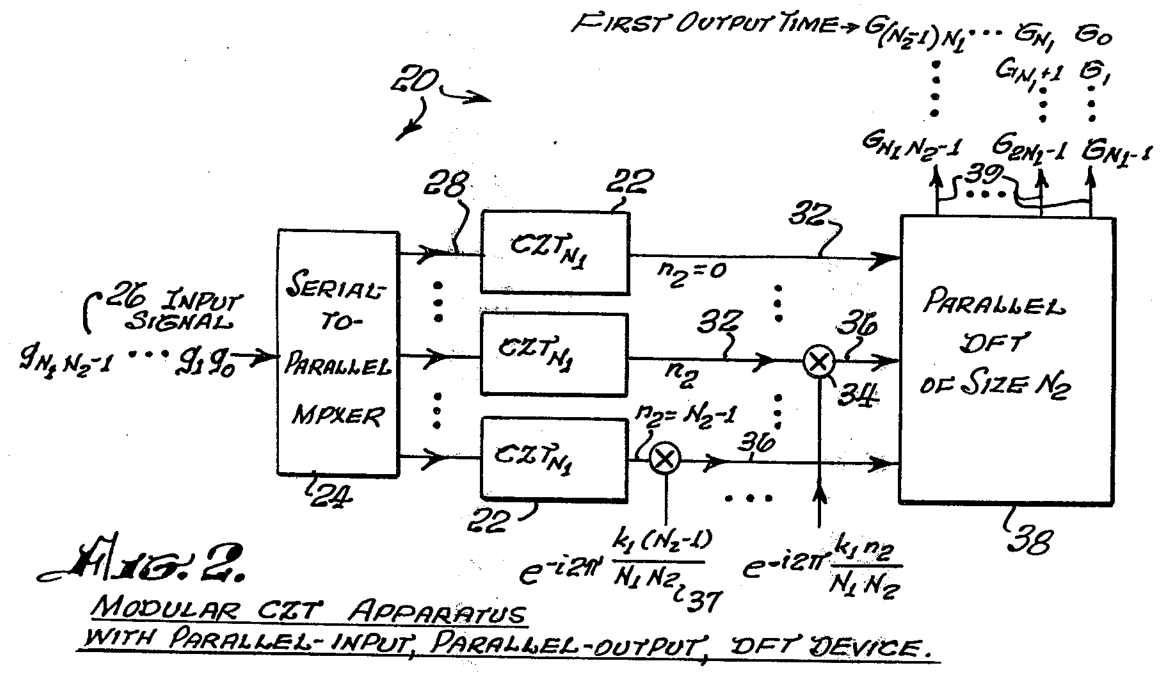
FIG. 2.
MODULAR CZT APPARATUS WITH PARALLEL-INPUT, PARALLEL-OUTPUT, DFT DEVICE.
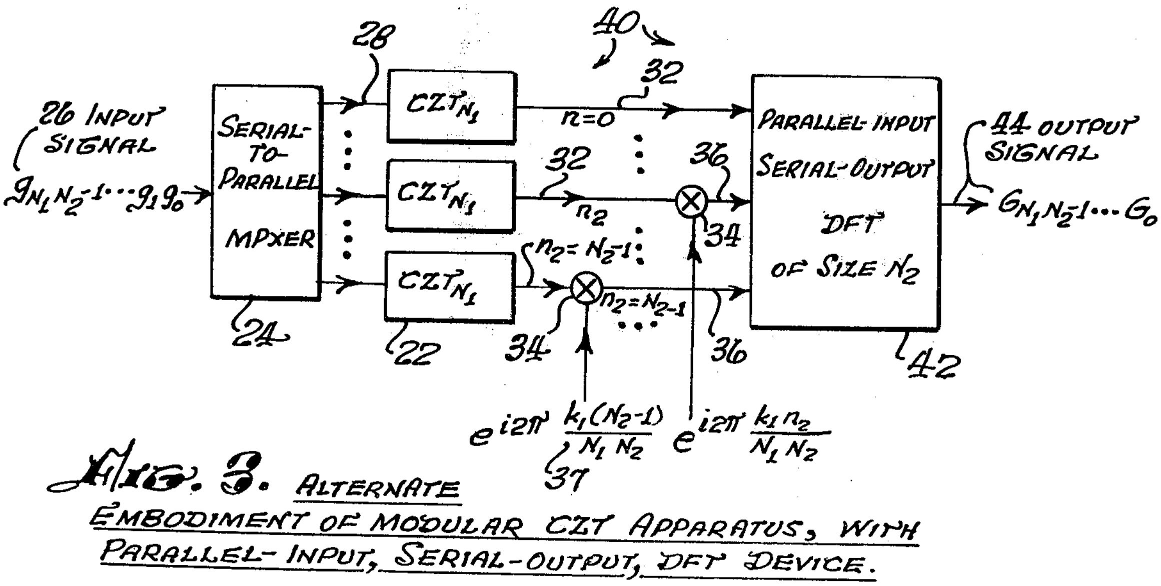
FIG. 3. ALTERNATE EMBODIMENT OF MODULAR CZT APPARATUS, WITH PARALLEL-INPUT, SERIAL-OUTPUT, DFT DEVICE.

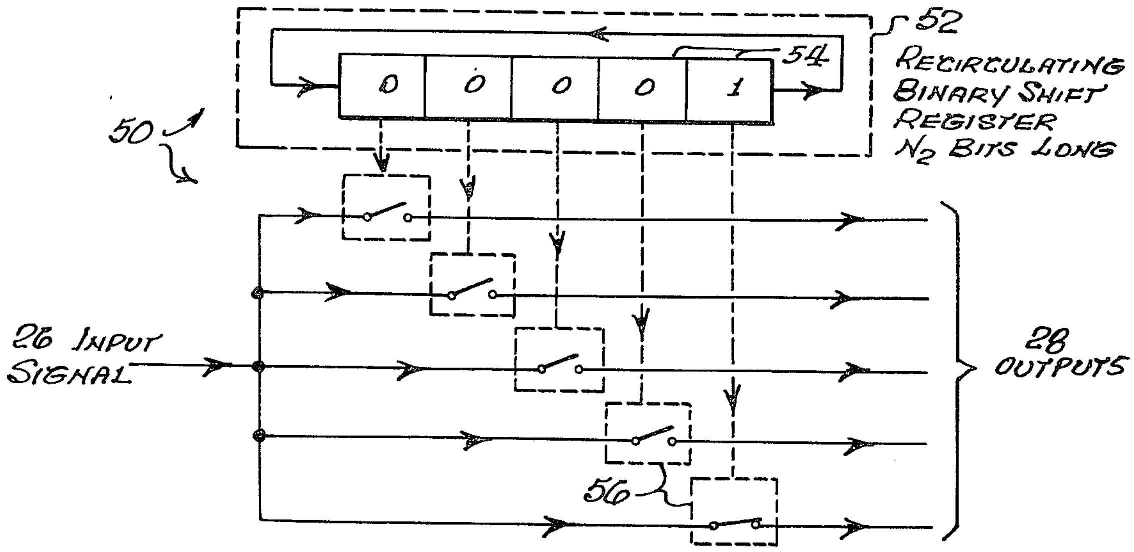
FIG. 4. SERIAL-TO-PARALLEL MULTIPLEXER
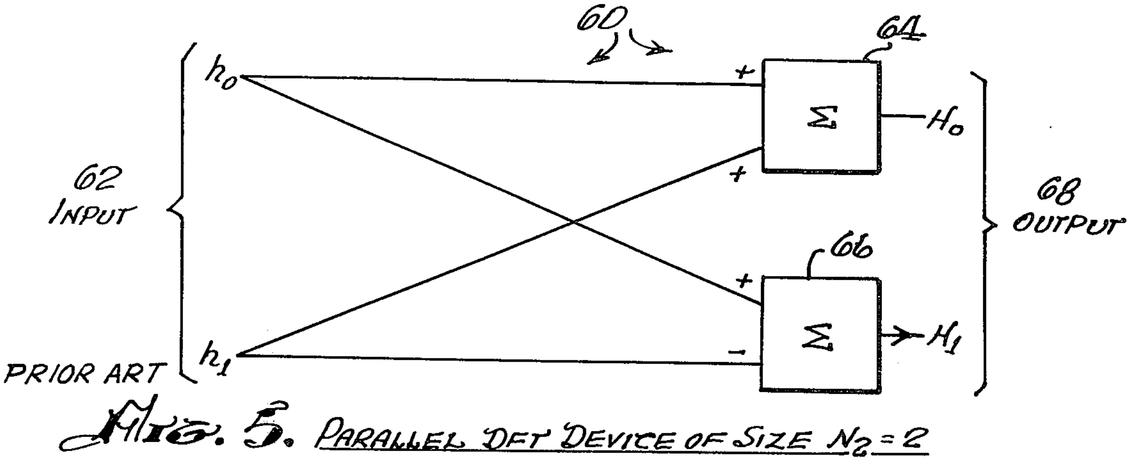
FIG. 5. PARALLEL DFT DEVICE OF SIZE $N_2=2$
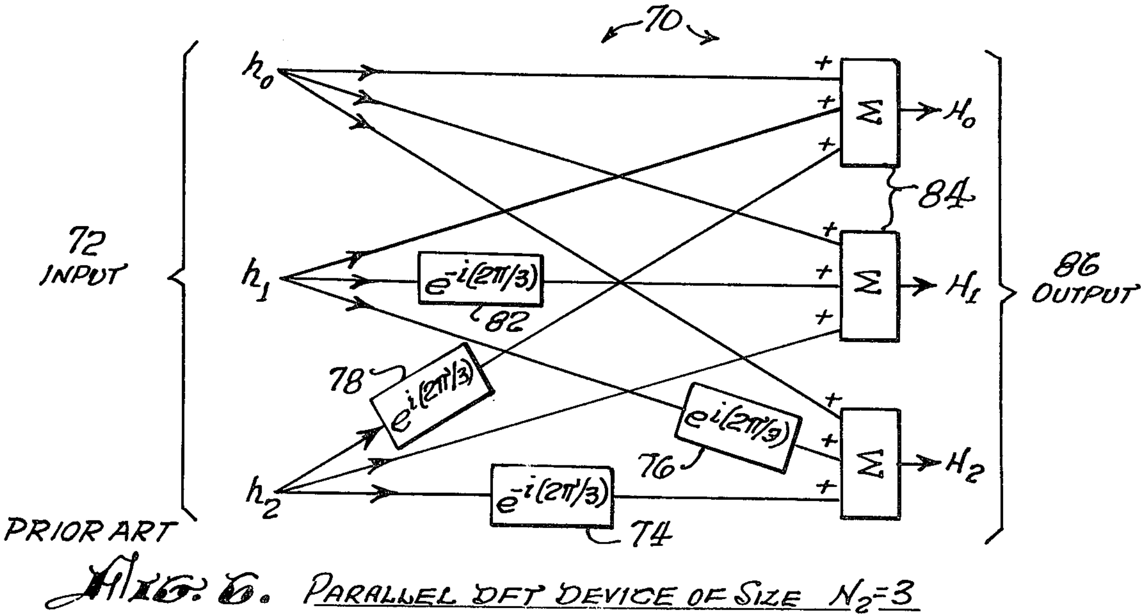
FIG. 6. PARALLEL DFT DEVICE OF SIZE $N_2=3$

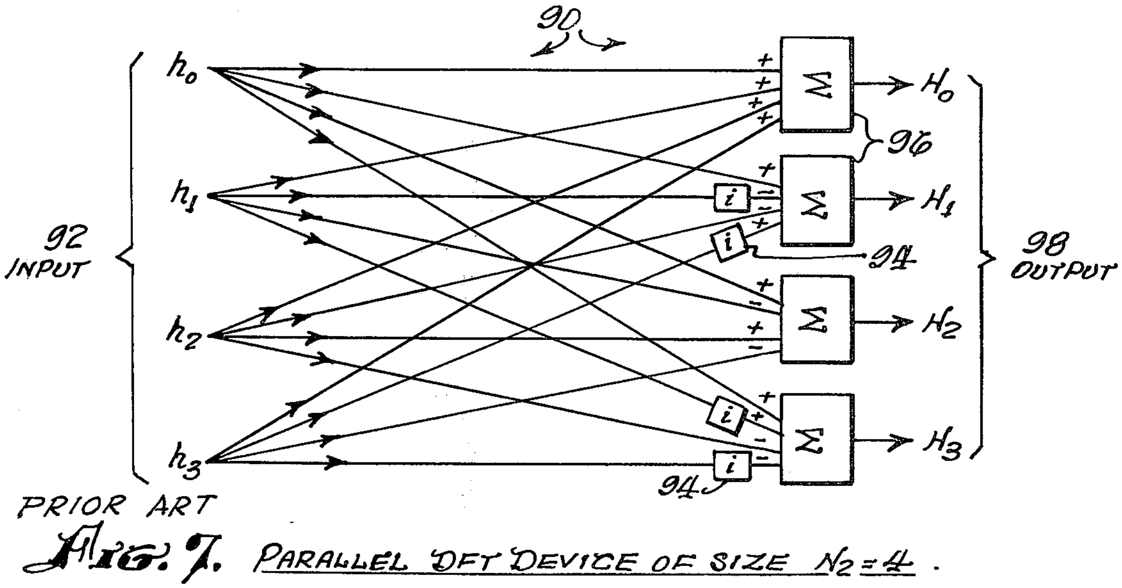
FIG. 7. PARALLEL DFT DEVICE OF SIZE $N_2=4$.
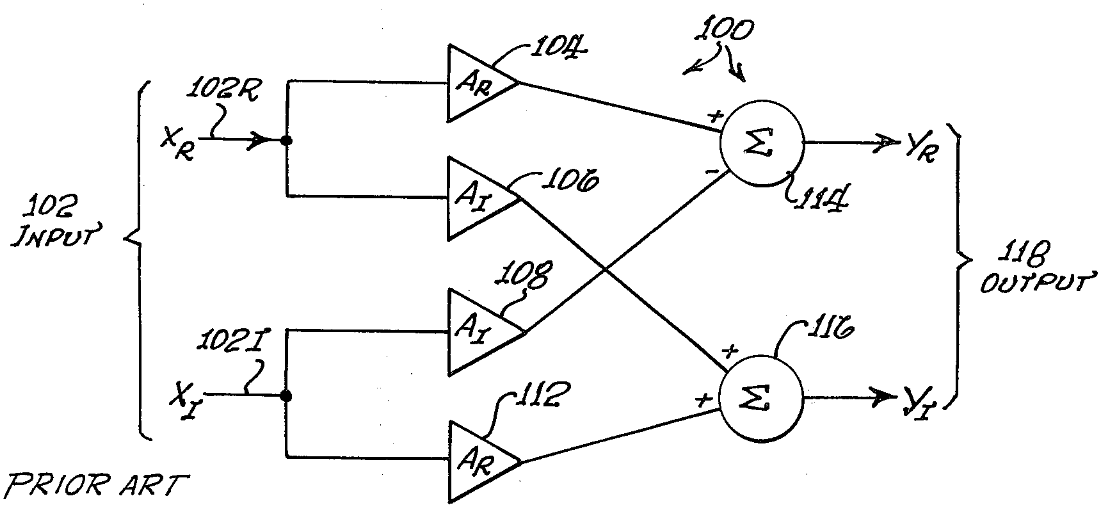
$Y_R + iY_I = (A_R + iA_I)(X_R + iX_I) = (A_R X_R - A_I X_I) + i(A_R X_I + A_I X_R)$.
FIG. 8. COMPLEX ATTENUATOR.
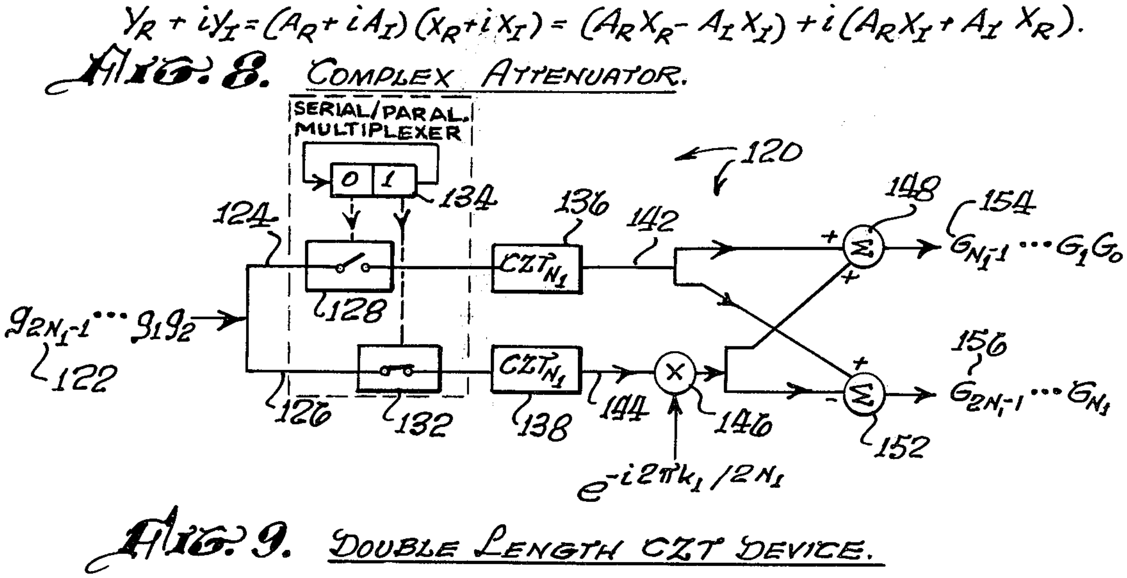
FIG. 9. DOUBLE LENGTH CZT DEVICE.

PARALLEL-INPUT, SERIAL-OUTPUT, CZT DEVICE USING MULTI-PORT TRANSVERSAL FILTER.

MODULAR USE OF PARALLEL-INPUT, SERIAL-OUTPUT, CZT DEVICE USING MULTIPORT TRANSVERSAL FILTER FOR $M=M_1M_2$.

MODULAR SYSTEM FOR PERFORMING THE DISCRETE FOURIER TRANSFORM VIA THE CHIRP-Z TRANSFORM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many signal processing problems require flexible real-time implementations of linear signal processing operations such as Fourier transforms, convolution, correlation, and beamforming. All of these operations may be performed at high throughput rates using the discrete Fourier transform (DFT) implemented via the chirp-Z transform (CZT) algorithm with a transversal filter or cross-convolver used to perform the required convolution or correlation with a discrete chirp. Special purpose methods have also been described in the prior art for combining a number of CZT modules to perform a longer DFT. The prior art methods, however, required a different acoustic surface wave filter for each different number of CZT modules to be combined. This limits the flexibility of the transform size attainable with a given set of components, and also prevents the longer transform system from being externally clocked, since the propagation time through the surface wave device cannot be varied by more than a small fraction of one percent.

SUMMARY OF THE INVENTION

The invention relates to an apparatus for combining $N_2$ chirp-Z transform (CZT) modules of length $N_1$ in order to generate a discrete Fourier transform (DFT) of length $N_1N_2$. The apparatus includes a serial-to-parallel multiplexer to which is applied a serial input signal, and which has $N_2$ parallel output signals. A plurality of $N_2$ chirp-Z transform devices, each of whose inputs comprise the outputs of the serial-to-parallel multiplexer has as outputs the chirp-Z transformed input signals. A plurality of $N_2$-1multipliers, each one having an input connected to one of the outputs of the chirp-Z transform devices, has outputs comprising chirp-Z transformed signals, each signal having a different delay.

A parallel discrete Fourier transform (DFT) device of size $N_2$, has as inputs the outputs of the $N_2$-1 multipliers, in addition to an output directly from one of the chirp-Z transform devices, its parallel outputs comprising the discrete Fourier transformed signals in parallel form.

An alternative embodiment has, instead of the parallel DFT device, a parallel-input, serial-output, discrete Fourier transform (DFT) device of size $N_2$, whose inputs comprise $N_2$-1 outputs from the multipliers and another direct output from one of the chirp-Z transform devices, the output of the DFT device comprising the discrete Fourier transformed signal in serial form.

OBJECTS OF THE INVENTION

An object of the invention is to provide apparatus, useful for signal processing operations which involve taking a transform of an input signal, which can be implemented in modular form.

Another object of the invention is to provide such an apparatus which can be implemented either with a parallel output or a serial output, depending upon which method is more advantageous.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a block diagram of a prior art direct chirp-Z transform implementation.

FIG. 2 is a block diagram of a modular CZT apparatus using a parallel-input, parallel-output, DFT device.

FIG. 3 is an alternate embodiment of a modular CZT apparatus using a parallel-input, serial-output device.

FIG. 4 is a block diagram of a possible implementation of the serial-to-parallel multiplexer shown in FIGS. 2 and 3.

FIGS. 5, 6 and 7 are block diagrams of prior art parallel discrete Fourier transform devices, with the number of parallel devices $N_2$ being a parameter.

FIG. 8 is a block diagram of the prior art complex attenuator used in FIGS. 6 or 7.

FIG. 9 is a block diagram of a chirp-Z transform (CZT) device having a double length.

DESCRIPTION OF THE PREFERRED EMBODIMENTS

Figure 10:
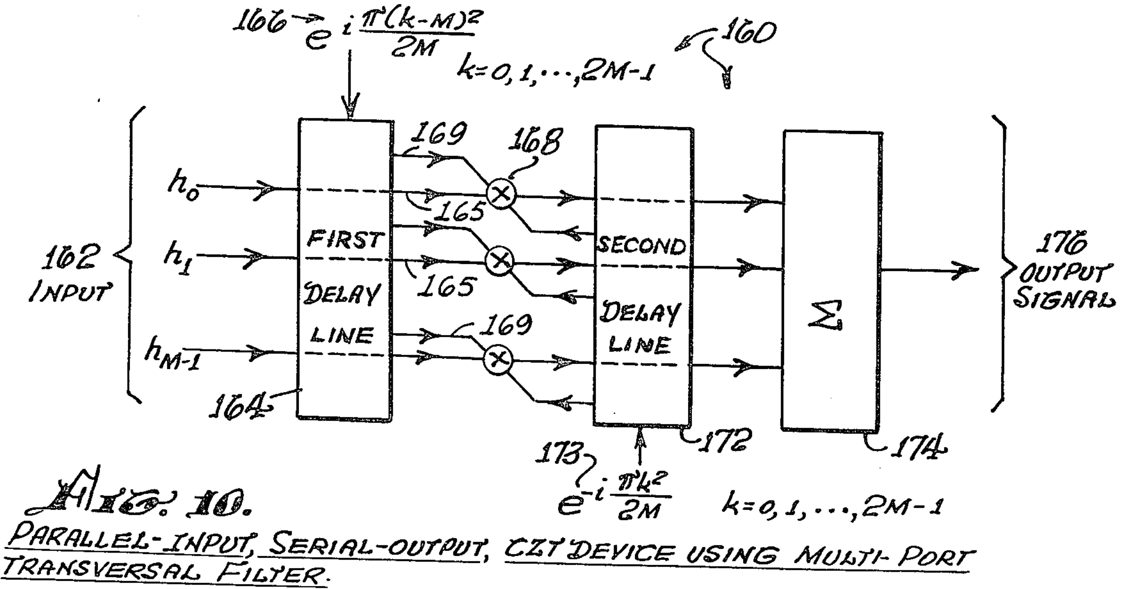
FIG. 10 is a block diagram of CZT device having a parallel input, a serial output, and using a multi-port transversal filter.

Reference is first directed to the prior art implementation shown in FIG. 1.

Many signal processing problems require flexible real-time implementations of linear signal processing operations. All of these operations may be performed at high throughput rates using the discrete Fourier transform implemented via the CZT algorithm, with a transversal filter or cross convolver used to perform the required convolution or correlation with a discrete chirp, as shown in FIG. 1 and described by equations (1) - (3).

$$H_k = \sum_{j=0}^{M-1} h_j e^{\frac{-i2\pi jk}{M}} \quad (1)$$

$$H_k = P_k^* \sum_{j=0}^{M-1} [h_j P_j^*] P_{k-j} \quad (2)$$

$$P_s = e^{\frac{i\pi S^2}{M}} = P_{-s} \quad (3)$$

Eqs. (1), (2) and (3) relate to the chirp-Z transform and ways of implementing the equations. This has been suggested first by Bluestein in 1968.

Equation (1) shows the relationship between the transformed output signal samples $H_k$ and the input signal samples $h_j$. As shown in FIG. 1, the dummy index $j$ has a range from 0 to M-1, and the dummy index $k$ also has the same range. The letter M designates the block size of the transform, and is equal to the number of input data samples $M \geq 1$. The letter $k$ in $H_k$ is also a dummy index relating to any output term.

Using the identity $-2\,jk = -j^2 + (j-k)^2 - k^2$, which is derived from the expansion for $-(j+k)^2$, and inserting it into Eq. (1), Eq. (2) is obtained. Eq. (2) is a shorthand notation for Eq. (2*a*):

$$H_k = e_+^{j\pi k^2/M}\,[h_j\,e_+^{j\pi j^2/M}]\,e^{j\pi (k-j)^2/M} \qquad (2a)$$

The first $j$ term refers to the imaginary term.

The P terms in FIG. 1 are defined by Eq. (3). Here, $s$ is another dummy index. The left-and right-hand terms of Eq. (3) show that P has the same value whether the dummy index s is positive or negative. Eq. (3) defines an infinite sequence, although all terms need not be used, and generally would not be used.

In terms of what can be accomplished by representative components, a transversal filter will generally have 500 taps or fewer, in the present state of the art. Therefore, the number of taps $P_n$ in FIG. 1 would be 250 or less.

The asterisk in Eq. (2) and in FIG. 1 indicates the complex conjugate of a similar unstarred term.

The embodiment 10 shown in FIG. 1 is described by Whitehouse, H. J., Speiser, J. M. and Means, R. W., *High Speed Serial Access Linear Transform Implementations*, presented at the All Applications Digital Computer (AADC) Symposium, Orlando, Florida, 23–25 January 1973.

Referring now to FIG. 2, this figure shows an apparatus 20 for combining $N_2$ chirp-Z transform (CZT) modules 22 of length $N_1$ in order to generate a discrete Fourier transform (DFT) of length $N_1N_2$. The apparatus 20 includes a serial-to-parallel multiplexer 24 to which is applied a serial input signal 26, a sampled analog or continuous analog signal, the multiplexer having $N_2$ parallel output signals on leads 28.

By a survey of the charge-coupled device (CCD) literature, it could be determined that a reasonable limit for the number $N_1$ is 256, in the present state of the art.

Also in the present state of the art, and referring to FIGS. 2 and 3, as could be determined from a survey of the surface acoustic wave (SAW) literature, 32 channels are feasible and currently realizable. Therefore, the term $N_2$ may have a value of up to 32, possibly even up to 128.

A plurality of $N_2$ chirp-Z transform devices 22, of block size $N_1$, each of whose inputs, on leads 28, comprise the outputs of the serial-to-parallel multiplexer 24, have as outputs 32 the chirp-Z transformed input signals.

A plurality of $N_2$-1 multipliers 34, each one having an input 32 connected to one of the outputs of the chirp-Z transform devices 22, has outputs, which comprise chirp-Z transformed signals 36. Each multiplier output signal 36 has a different delay correction, due to different signals 37 which form the second inputs to the multipliers.

A parallel discrete Fourier transform (DFT) device 38 of size $N_2$ has as inputs 36 the outputs of the $N_2$-1 multipliers 34, in addition to an output directly from one of the chirp-Z transform devices 22, the top one in FIG. 2. The parallel outputs 39 of device 38 comprise the discrete Fourier transformed signals in parallel form.

In FIG. 2 the parallel DFT device 38 of size $N_2$ has $N_2$ input channels 36 and 32, and $N_2$ output channels 39.

The top line in the figure, designating $G_{(N_2-1)N_1} \ldots G_{N_1}G_0$, represents the transform output signal at the first output time. The last line, the bottom line, of the output signals 39 represents a sum of the transform samples at the last output time.

Referring now to FIG. 3, this figure shows an apparatus 40 similar to the apparatus 20 shown in FIG. 2, except for the output device 42. In the apparatus 40, it comprises a parallel-input, serial-output, discrete Fourier transform (DFT) device 42 of size $N_2$, whose inputs, 36 and 32, comprise $N_2$-1 outputs from the multipliers 34 and another direct output 32 from one of the Chirp-Z transform devices 22, the output of the DFT device comprising the discrete Fourier transformed signal 44 in serial form.

Referring now to FIG. 4, in the apparatus 20 of FIG. 2 or 40 of FIG. 3, the serial-to-parallel multiplexer 50 of FIG. 4 may comprise a recirculating binary shift register 52 having $N_2$ cells 54, that is, of length $N_2$. The multiplexer 50 includes a plurality of switching means 56, generally electronic, each of the switching means having as an input the signal 26 which is to be chirp-Z transformed. The state of each of the switching means 56, that is, whether it permits the input signal 26 to propagate through the switching means or not, is controllable by each of the cells 54 of the shift register. A zero in a cell 54 will not permit the input signal 26 to propagate through the switching means 56, a 1 in the cell will permit the switching means to propagate a signal through the switching means, the parallel outputs of the multiplexer 50 corresponding to the binary states of the shift register 52.

The parallel DFT device 38 required for the second partial, vertical, transform in FIG. 2 may be implemented as a combination of summers and attenuators. This is shown in FIGS. 5–7 for $N_2$=2, 3, and 4. The first partial transform is performed by the individual serial access CZT's 22. The data is effectively two dimensional, and therefore involves a horizontal transform and a vertical transform.

FIG. 8 shows an attenuator 100 which can process a complex signal, by using components which operate on real terms only. The complex attenuator 100 comprises four real attenuators, 104, 106, 108 and 112, a differencer 114 and a summer 116. Attenuators 100 of the type shown in FIG. 8 are required for the embodiments, 70 and 90, shown in FIGS. 6 and 7, which use complex attenuators. The attenuators may take the form of voltage dividers, for example.

In general, the attenuation factors are complex, requiring separate weightings for the real and imaginary parts as shown in FIG. 8. The attenuation factors are all in the form $e^{j\theta}$. Therefore, the magnitude of the components of the complex number, cosine $\theta$ and sine $\theta$, are equal to or less than 1. It follows, therefore, in FIG. 8, that the attenuation factors, $A_R$, designated by reference numerals 104 and 112, and $A_I$, designated by reference numerals 106 and 108, are equal to or less than 1.

A complete double length CZT device 120 is shown in FIG. 9. Unfortunately, a parallel DFT implementation of this type becomes unwieldy if the dimension $N_2$ is very large. FIG. 9 represents a specific implementation of FIG. 2, with $N_2$ equal to 2.

FIGS. 5 through 8 show particular ways of realizing the parallel DFT device 38 of FIG. 2. If the embodiments shown therein are used to fulfill the requirements of FIG. 2, $N_2$ different inputs are required.

In general, implementations of the parallel input transform, of the type which is shown in FIG. 7, may get very complicated but if the size of the second, vertical, transform is only two, if only a two-point transform is involved, then it is reasonably simple, as shown in FIG. 9. Elements 128, 132 and 134 comprise a two-cell serial-to-parallel multiplexer, of the type shown in FIG. 4.

The vertical length of the transform is two, which is being accomplished by one summer 148 and one differencer 152, which comprise a simplified form of the DFT device 42 of FIG. 3.

Referring now to FIG. 10, this figure shows a parallel-input serial-output apparatus 160 for the generation of the discrete Fourier transform (DFT), to which is applied a serial-input signal, $h_0, h_1, \ldots, h_{M+1}$, which it is desired to Fourier transform.

A first delay line 164 has applied to it a chirp signal, $e^{i\pi(k-M)/2M}$, the delay line having M taps 165.

A plurality of M multipliers 168 has applied to it the input signals 162 the outputs from the taps 165 of the first delay line 164 also forming an input to each multiplier.

A second delay line 172, having M taps 169, has applied to it a chirp signal, $e^{-i\pi k^2/2M}$. The outputs of the taps 169 also form an input to the multipliers 168.

A signal summer 174, whose M inputs comprise the outputs of the multipliers 168, has an output signal 176 which is a discrete Fourier transform in serial form of the input signal, $h_0, h_1, \ldots, h_{M-1}$.

Figure 11:
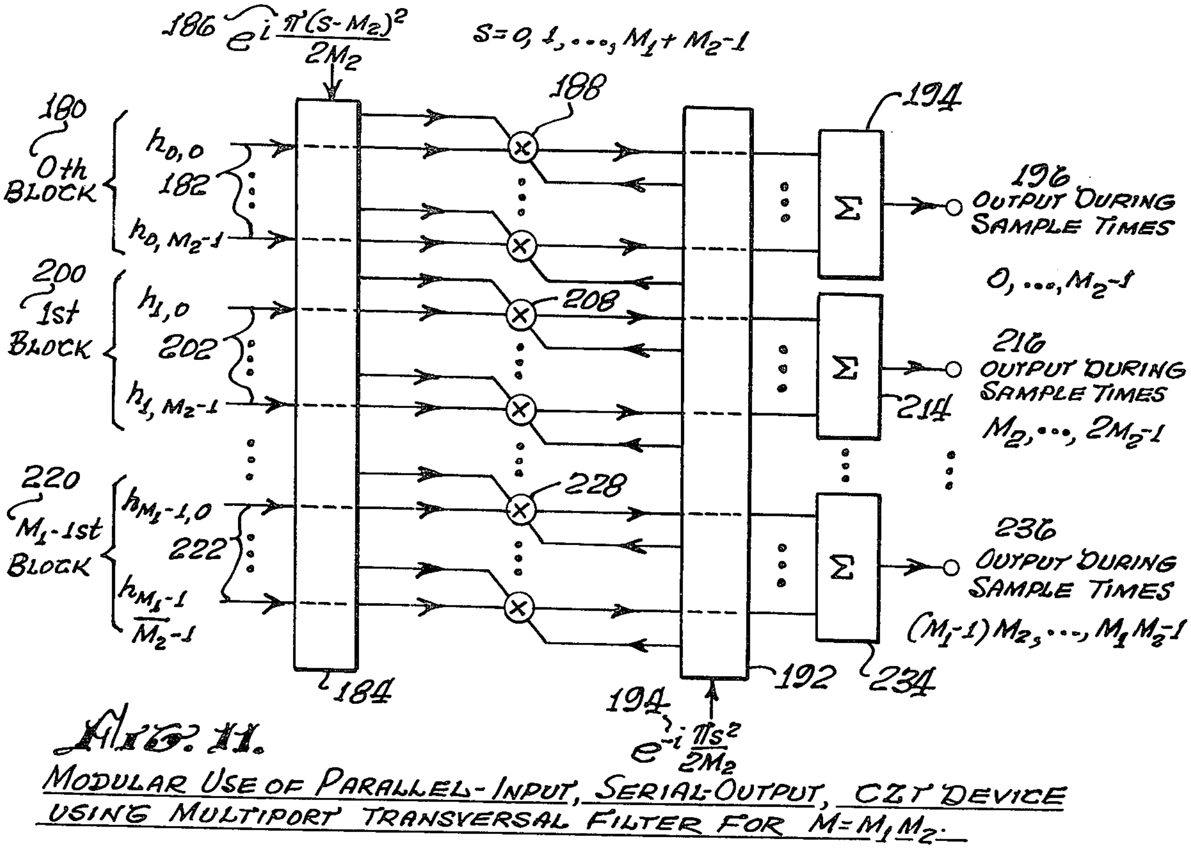
FIG. 11 is a block diagram of a device having a modular use of parallel-input and serial-output CZT, and using a multi-port transversal filter.

Referring now to FIG. 11, this figure shows an embodiment consisting of three blocks 180, 200, and 220, wherein the inputs, 182, 202, and 222, are partitioned into blocks and wherein the output summer is also partitioned into blocks 194, 214, and 234. A specific summer, 194, 214, or 234, sums only those signals which are simultaneously propagating under the portions of the two delay lines, 184 and 192, corresponding to the taps which are being summed.

For example, with reference to the 0th block 180, assume that a short discrete chirp is introduced into each of the two delay lines 184 and 192. The discrete chirp would have to be of the same size as would be used with any of the individual blocks, 180, 200 or 220. Then, the only thing that is necessary is that those two short chirps propagate under the corresponding sections of the two delay lines in the proper time alignment. That would be equivalent to using the short device 160 which is shown in FIG. 10.

The easiest way in which this can be done is to make one of the chirps a short one and the other one also a short one, but periodically repeated. If the input on one of the two delay lines, 184 or 192, is 0, the output is 0, so that what happens is that as the short chirp moves along through successive blocks, 180, 200, or 220, it only produces an output for that block under which it is lying. As it propagates through one of those blocks, 180, 200 or 220, it will overlap with one period of the periodic repetition of the long chirp, the periodically repeated chirp, propagating down the other delay line, and so far as that block is concerned it is equivalent to the short version of the parallel-input serial-output CZT device 160 which is shown in FIG. 10.

If the partitioned version of the vertical transform device of FIG. 11 is used, then each block, 180, 200 or 220, of the device can be used to perform a short vertical transform.

Each section of the apparatus of FIG. 11 handles the same kind of signal, the same kind of chirps, which are used in FIG. 10. One difference is that those chirps are delayed by propagation down to the delay lines, 184 and 192.

Another thing that is different about the embodiment shown in FIG. 11 is that there are at least two different possible modes of operation. In one mode, each of the subsections, the blocks 180, 200 or 220, performs the same way as the apparatus 160 shown in FIG. 10. In the alternative mode, the outputs from the individual summers, 194, 214 and 234, are themselves all summed together. The apparatus is similar to that, 160, of FIG. 10, only it has $M_1$ times the capacity of the embodiment 160 shown in FIG. 10. It could be three times, as shown in this Figure or any integral multiple.

This is mathematically equivalent to doing several transforms of intermediate size. In other words, if the vertical transform dimension, $M_1$ in FIG. 11, be taken and the numerical value of it factored into the product of $P_1$ times $P_2$, that is, if $M_1 = P_1P_2$, $P_1$ different vertical transforms of size $P_2$ may be performed in conjunction with horizontal transforms of size $N_1$, resulting in a total of $P_1$ simultaneous one-dimensional transforms of size $P_2N_1$.

The theory upon which the invention is based will now be discussed in great detail.

A one-dimensional discrete Fourier transform may be written as a partial transform of a double subscripted representation of the data, followed by a pointwise multiplication, followed by a second partial transform, as shown in equations (4)–(9).

$$G_k = \sum_{n=0}^{N-1} g_n e^{\frac{-i2\pi kn}{N}} \quad \text{for } k = 0, \ldots N_1-1 \quad N = N_1N_2 \tag{4}$$

Let $$n = n_1N_2 + n_2 \quad \text{for } k_1, n_1 = 0, \ldots N_1-1 \tag{5}$$

$$k = k_1 + k_2N_1 \quad k_2, n_2 = 0, \ldots N_2-1 \tag{6}$$

$$G_{k_1+k_2N_1} = \sum_{n_1=0}^{N_1-1} \sum_{n_2=0}^{N_2-1} g_{n_1N_2+n_2} e^{\frac{-i2\pi(k_1+k_2N_1)(n_1N_2+n_2)}{N_1N_2}} \tag{7}$$

$$G_{k_1+k_2N_1} = \sum_{n_1=0}^{N_1-1} \sum_{n_2=0}^{N_2-1} g_{n_1N_2+n_2} e^{\frac{-i2\ k_1n_1}{N_1}} e^{\frac{-i2\pi k_2n_2}{N_2}} e^{\frac{-i2\ k_1n_2}{N_1N_2}} \tag{8}$$

$$G_{k_1+k_2N_1} = \sum_{n_2=0}^{N_2-1} e^{\frac{i2\pi k_2n_2}{N_2}} \left\{ e^{\frac{-i2\pi k_1n_2}{N_1N_2}} \sum_{n_1=0}^{N_1-1} g_{n_1N_2+n_2} e^{\frac{-i2\pi k_1n_1}{N_1}} \right\} \tag{9}$$

Eq. 7 represents a discrete Fourier transform of size $N_1$ times $N_2$ or N equals $N_1N_2$. Eq. 8 shows how this long transform may be performed as a succession of shorter transforms and some intermediate multiplications.

Given a long discrete Fourier transform of length N that it is desired to perform. Eq. 7 represents rewriting of Eq. 4, using the two-dimensional representation for the data indices and the transform indices, a two-dimensional representation being shown in Eqs. 5 and 6. The final calculations would be implemented as shown in Eq. 9. The double indexing of the G's indicates that essentially what is done is to sample the $g$ sequence at points spaced apart from one another by an amount $N_2$. Each time $h_1$ is incremented, the sample point is moved by the amount $N_2$, with subsequences $n_2$ acting as an index, indicating which specific subsequence is being referred to.

The innermost summation of Eq. 9 is the discrete Fourier transform of size $N_1$ of one of the subsequences with index $n_2$. So for each subsequence, a one-dimensional Fourier transform of size $n_1$ must be performed. Now, that operation is followed by a point by point multiplication $e^{-i2\pi k_1 n_2/N_1N_2}$. For each value of $n_2$, that multiplication function can be thought of as a complex sinusoid whose frequency depends upon $n_2$. So essentially the data may be considered as a set of subsequences, the subsequence index $n_2$ being a vertical index and the subsequence index $n_1$ being a horizontal index. The effective two-dimensional array, as shown in Eq. 9 is first partially transformed in the horizontal direction. Then a point by point multiplication is performed, and then a transform of length $N_2$ is performed in the vertical direction.

As stated hereinabove, Eq. (9) is implemented by the apparatus 20 shown in FIG. 2 or the apparatus 40 shown in FIG. 3. FIG. 2 and FIG. 3 are equivalent in so far as the output they provide is concerned, the only difference is one has parallel and the other serial access to the final transform points.

Relating the mathematics to FIG. 2, an input signal 26 is switched at successive times to the successive CZT modules 22. The signals on leads 28 and 32 are for fixed $n_2$, the $n_2$ on adjacent leads being spaced $N_2$ units apart. The signals on leads 28 form inputs to the CZT devices 22, which are of size $N_1$. As indicated in Eq. (9), this is equivalent to the serial-to-parallel multiplexer 24 being accessed by points with the subscript $n_1N_2 + n_2$, that is by points $g_{n_1N_2+n_2}$.

From a different viewpoint, in FIGS. 2 and 3, the bank of CZT devices 22 of size $N_1$ performs the transform with respect to $n_1$, which amounts to performing a partial CZT with respect to $n_1$, with fixed $n_2$. A point by point multiplication then ensues.

If $n_2$ is fixed, it may then be viewed as a function of $k_1$, and the right summation term in Eq. (9) is a sinusoid, a complex sinusoid. This is what is being accomplished by the multipliers 34 shown in FIGS. 2 and 3. It will be observed that the exponentials at the bottom of FIGS. 2 and 3 occur as the first exponential within the brackets of Eq. (9).

In the uppermost channel 32, in FIGS. 2 and 3, the exponential term becomes $e^0$, which represents 0 frequency and is therefore a constant.

The transform has to be subsequently performed with respect to $n_2$, which amounts to a transform over the vertical direction.

Other types of discrete Fourier transform implementations may be derived from the identities of Eq. (10)–(12).

$$H_k = \sum_{n=0}^{M-1} e^{\frac{-i2\pi kn}{M}} h_n \qquad (10)$$

$$kn = \tfrac{1}{4}\,(k+n)^2 - (k-n)^2 \qquad (11)$$

$$H_k = \sum_{n=0}^{M-1} e^{\frac{-i\pi(k+n)^2}{2M}} e^{\frac{i\pi(k-n)^2}{2M}} h_n \text{ for } K=0, \ldots M-1 \qquad (12)$$

These equations have been used to design a transform device in which signals are shifted through two delay lines at different speeds. Alternatively, if the factors in equation (12) are interpreted as two waves propagating in opposite directions relative to the function to be transformed, it may be seen that the structure of FIG. 10 also performs a discrete Fourier transform with speed comparable to that of a CZT device. By changing the reference functions applied to the delay lines and partitioning the input leads and output summer as shown in FIG. 11, the hardware of FIG. 10 may also perform several shorter discrete Fourier transforms. If the parallel input-serial output CZT device of FIG. 11 is used in the modular CZT apparatus of FIG. 3, then $M_1$ discrete Fourier transforms of length $M_2N_1$ may be performed simultaneously, where $N_2 = M_1M_2$ is any factorization of $N_2$.

In Eq. (12), $n$ may be viewed as a space index and $k$ as a frequency index. Now, if $n$ is fixed, the left-hand chirp has argument $(k+n)$, where $k$ is the transform index.

Assume a common delay line with chirps introduced into the delay line from opposite directions. In a given direction along the delay line, one of the chirps will be advanced in that direction and the other one will be retarded. This corresponds to the expressions for the exponentials shown in Eq. 12.

The basic CZT modules may use acoustic surface-wave transversal filters, charge-coupled device transversal filters, or digital shift registers with separate multipliers. If surface-wave filters are used in the short CZT modules of the first partial transform, then the configuration of FIG. 3, however, is not suitable, since the second partial transform is required to operate at a faster rate than the first partial transform.

Obviously many modifications and variations of the present invention are possible in the light of the above teachings. It is therefore to be understood that within the scope of the appended claims the invention may be practiced otherwise than as specifically described.

What is claimed is:

1. Apparatus for combining $N_2 \leq 32$ chirp-Z transform (CZT) modules of length $N1 \leq 256$ in order to generate a discrete Fourier transform (DFT) of length $N_1N_2$ comprising:

a serial-to-parallel multiplexer to which may be applied a serial input signal and which has $N_2$ parallel outputs;

a plurality of $N_2$ chirp-Z transform devices, each of whose inputs comprise the outputs of the serial-to-parallel multiplexer, the input signals being transformed into chirp-Z transform signals;

a plurality of $N_2$-1 multipliers, each one having an input connected to the output of the chirp-Z transform devices, the outputs comprising chirp-Z transformed signals, each signal having a different delay; and a parallel discrete Fourier transform (DFT) device of size $N_2$, having as inputs the outputs of the $N_2$-1 multipliers in addition to an output directly from one of the chirp-Z transform devices, its parallel outputs comprising the discrete Fourier transformed signals in parallel form.

2. The apparatus according to claim 1 wherein the serial-to-parallel multiplexer comprises:

a recirculating binary shift register having $N_2$ cells, that is, of length $N_2$;

a plurality of switching means, each of the switching means having as an input the signal which is to be chirp-Z transformed, the state of each of the switching means, that is, whether it permits the input signal to propagate through the switching means or not, is controllable by each of the cells of the shift register, a zero in a cell not permitting the input signal to propagate through the switching means, a 1 in the cell permitting the switching means to propagate a signal through the switching means, the parallel outputs of the multiplexer corresponding to the binary states of the shift register.

3. Apparatus for combining $N_2$ chirp-Z transform (CZT) modules of length $N_1$ in order to generate a discrete Fourier transform (DFT) of length $N_1N_2$, comprising:

a serial-to-parallel multiplexer to which may be applied a serial input signal and which has $N_2$ parallel outputs:

a plurality of $N_2$ chirp-Z transform devices, each of whose inputs comprise the outputs of the serial-to-parallel multiplexer, the input signals being transformed into chirp-Z transform signals:

a plurality of $N_2$-1 multipliers, each one having an input connected to the output of the chirp-Z transform devices, the outputs comprising chirp-Z transform signals, each signal having a different delay; and a parallel-input, serial-output, discrete Fourier transform (DFT) device of size $N_2$, whose inputs comprise $N_2$-1 outputs from the multipliers and another, direct, output from one of the chirp-Z transform devices, the output of the DFT device comprising the discrete Fourier transformed signals in serial form.

4. The apparatus according to claim 3, wherein the serial-to-parallel multiplexer comprises:

a recirculating binary shift register having $N_2$ cells, that is, of length $N_2$;

a plurality of switching means, each of the switching means having as an input the signal which is to be chirp-Z transformed, the state of each of the switching means, that is, whether it permits the input signal to propagate through the switching means or not, is controllable by each of the cells of the shift register, a zero in a cell not permitting the input signal to propagate through the switching means, a 1 in the cell permitting the switching means to propagate a signal through the switching means, the parallel outputs of the multiplexer corresponding to the binary states of the shift register.

5. A combination useful in apparatus for the generation of a discrete Fourier transform (DFT) comprising:

a first delay line to which is applied a chirp signal, $e^{i\pi(k-M)^2/2M}$, $k=0, 1, \ldots, 2M-1, M > 1$, the delay line having M output taps;

a plurality of M multipliers, to which are applied parallel input signals, namely $h_0, h_1, \ldots h_{M-1}$, the outputs from the taps of the first delay line also forming an input to each multiplier;

a second delay line having M taps, to which is applied a chirp signal, $e^{-i\pi k^2/2M}$, $k=0, 1, \ldots, 2M-1$, the outputs of the taps of this delay line also forming inputs to the multipliers; and a signal summer, whose M inputs comprise the outputs of the multipliers, the summer having an output signal which is in the form of a discrete Fourier transform in serial form on the input signal, $h_0, h_1, \ldots, h_{M-1}$.

6. The combination according to claim 5, further comprising:

means for generating the chirp signal $e^{i\pi(k-M)^2/2M}$, $k = 0, 1, \ldots, 2M-1$, and means for generating the chirp signal $e-{}^{\pi k^2/2M}$, $k$ having the same range;

the combination comprising apparatus for the generation of the discrete Fourier transform.

* * * * *